United States Patent
Margol et al.

(10) Patent No.: US 8,688,313 B2
(45) Date of Patent: Apr. 1, 2014

(54) REMOTE VEHICLE PROGRAMMING SYSTEM AND METHOD

(75) Inventors: Lonnie E Margol, Jacksonville, FL (US); Walter W McIntyre, Middleburg, FL (US); Richard C Delashmutt, Jacksonville, FL (US); Daniel J Stiltner, Jacksonville, FL (US); Charles P Olsen, St. Johns, FL (US)

(73) Assignee: AES Technologies, LLC., Jacksonville, FL (US)

( * ) Notice: Subject to any disclaimer, the term of this patent is extended or adjusted under 35 U.S.C. 154(b) by 56 days.

(21) Appl. No.: 12/977,830

(22) Filed: Dec. 23, 2010

(65) Prior Publication Data

US 2011/0106374 A1    May 5, 2011

(51) Int. Cl.
*G01M 17/00*    (2006.01)

(52) U.S. Cl.
USPC ........................................ 701/31.4; 710/310

(58) Field of Classification Search
USPC .................. 701/33, 29.1, 31.4, 33.2; 710/305
See application file for complete search history.

(56) References Cited

U.S. PATENT DOCUMENTS

| | | | |
|---|---|---|---|
| 5,491,418 A * | 2/1996 | Alfaro et al. ................... 324/402 |
| 6,611,739 B1 | 8/2003 | Harvey et al. | |
| 6,728,603 B2 * | 4/2004 | Pruzan et al. ...................... 701/1 |
| 6,928,349 B1 * | 8/2005 | Namaky et al. .............. 701/32.7 |
| 6,956,501 B2 | 10/2005 | Kitson | |
| 7,209,817 B2 | 4/2007 | Abdel-Malek et al. | |
| 7,373,226 B1 | 5/2008 | Cancilla et al. | |
| 7,487,018 B2 | 2/2009 | Afshar et al. | |
| 7,502,672 B1 | 3/2009 | Kolls | |
| 7,519,458 B2 | 4/2009 | Buckley | |
| 7,532,962 B1 | 5/2009 | Lowrey et al. | |
| 7,584,030 B1 | 9/2009 | Graham | |
| 2005/0038581 A1 | 2/2005 | Kapolka et al. | |
| 2005/0065678 A1 | 3/2005 | Smith et al. | |
| 2005/0251304 A1 * | 11/2005 | Cancellara et al. ............. 701/33 |
| 2006/0041337 A1 | 2/2006 | Augsburger et al. | |
| 2006/0106508 A1 | 5/2006 | Liebl et al. | |
| 2006/0202862 A1 * | 9/2006 | Ratnakar ....................... 340/933 |
| 2006/0217855 A1 * | 9/2006 | Chinnadurai et al. .......... 701/29 |
| 2007/0005201 A1 | 1/2007 | Chenn | |
| 2007/0043488 A1 * | 2/2007 | Avery et al. ..................... 701/33 |
| 2007/0118256 A1 | 5/2007 | Chigusa | |
| 2007/0185624 A1 * | 8/2007 | Duddles et al. ................... 701/1 |
| 2007/0198147 A1 | 8/2007 | Keith et al. | |

(Continued)

FOREIGN PATENT DOCUMENTS

KR    2002027758    4/2002

*Primary Examiner* — Helal A Algahaim
*Assistant Examiner* — Shardul Patel
(74) *Attorney, Agent, or Firm* — Lott & Fischer, PL (57) ABSTRACT

A system and method for remotely programming a vehicle including a vehicle connector with a plurality of pins in communication with one or more vehicle sub-systems or modules, a vehicle communication device connected to the vehicle connector; a bi-directional communication link between the vehicle communication device and a remote communication device, and a computer system connected to the remote communication device. The vehicle communication device is configured to receive signals from the pins, convert the signals to a network compatible data packet which can then be transmitted to the remote communication device, which re-coverts the signals to the pin signals, which can be read by a computing system, such as a vehicle scan tool. Programming instructions can be sent from the scan tool to the vehicle, over the bi-directional communication link between the remote communication device and the vehicle communication device.

17 Claims, 8 Drawing Sheets

(56) References Cited

U.S. PATENT DOCUMENTS

| | | |
|---|---|---|
| 2008/0161989 A1 | 7/2008 | Breed |
| 2008/0177438 A1 | 7/2008 | Chen et al. |
| 2008/0280602 A1* | 11/2008 | Ban .............................. 455/420 |
| 2009/0259358 A1 | 10/2009 | Andreasen |
| 2009/0265055 A1 | 10/2009 | Gillies |
| 2009/0326757 A1 | 12/2009 | Andreasen et al. |
| 2010/0174446 A1 | 7/2010 | Andreasen et al. |
| 2010/0262335 A1 | 10/2010 | Brozovich |
| 2011/0313593 A1* | 12/2011 | Cohen et al. ...................... 701/2 |
| 2012/0046826 A1* | 2/2012 | Panko ......................... 701/33.3 |

* cited by examiner

REMOTE VEHICLE PROGRAMMING SYSTEM AND METHOD

TECHNICAL FIELD

The present invention relates to vehicle programming systems and more particularly to a system and method for remotely programming a vehicle.

BACKGROUND OF THE INVENTION

On-board diagnostics ("OBD") systems allow a vehicle owner or technician to access vital information about the various modules and sub-systems within the vehicle. For many years, manufacturers have included complex OBD systems in their vehicles. Such OBD systems are typically accessible through a data link connector ("DLC") located under the dash of the vehicle. In a traditional repair setting, a technician utilizes a specialized scan tool that is adapted to interface with a given vehicle's OBD system over the vehicle's DLC. The scan tool is capable of reading data from the vehicle's sub-system for diagnostic purposes while also permitting the reprogramming of the sub-systems as desired. Typically these scan tools are stand-alone handheld computing devices, but there are some personal computer-based scan tools known in the art.

The first OBD systems, now known as OBD-I, were initially implemented to monitor a vehicle's emission control system for regulatory purposes. However, OBD-I was largely unsuccessful due to the lack of standardization of the OBD's placement within the vehicle, DLC configuration, and data format.

In response to the problems associated with OBD-I, OBD-II was developed. OBD-II presented a substantial improvement over OBD-I in both capability and standardization. The OBD-II standard specifies the type of diagnostic connector and its pinout, the electrical signaling protocols available, and messaging format. OBD-II also provides a candidate list of vehicle parameters to program, along with how to encode the data for each. OBD-II also introduced a standardized DLC—the female 16-pin (2×8) J1962 connector, as show in FIG. 1. Unlike the OBD-I connector, which was sometimes found under the hood of the vehicle, the OBD-II connector is required to be within 2 feet (0.61 m) of the steering wheel, and therefore is usually located under the dashboard. OBD-II also provided for a pin in the connector that provides power to the scan tool from the vehicle's battery, eliminating the need to connect a scan tool to a separate power source. Finally, the OBD-II standard provided an extensive list of standardized diagnostic trouble codes.

SAE J1962 defines the location of the OBD connector (i.e. within 2 feet of the steering wheel) and the pinout configuration thereof, as follows:
1. Manufacturer discretion.
2. Bus positive Line (for SAE-J1850 PWM and SAE-1850 VPW protocols)
3. Ford DCL(+) Argentina, Brazil (pre OBD-II) 1997-2000, USA, Europe, etc. Chrysler CCD Bus(+)
4. Chassis ground
5. Signal ground
6. CAN high (for ISO 15765-4 and SAE-J2284 protocols)
7. K line (for ISO 9141-2 and ISO 14230-4)
8. -
9. -
10. Bus negative Line (for SAE-J1850 PWM protocol)
11. Ford DCL(−) Argentina, Brazil (pre OBD-II) 1997-2000, USA, Europe, etc. Chrysler CCD Bus(−)
12. -
13. -
14. CAN low (for ISO 15765-4 and SAE-J2284 protocols)
15. L line (for ISO 9141-2 and ISO 14230-4 protocols)
16. Battery voltage Although OBD-II provided some advantageous standardization across man vehicle manufacturers, the manufacturers still chose to employ different communication protocols, i.e. signal formats, for their particular OBD systems. Such protocols include, for example SAE J1850 PWM, SAE VPM, ISO 9141-2, ISO 14230, and ISO 15765. Each of these protocols varies in pinout configuration and signal characteristics.

For example, SAE J1850 PWM (pulse-width modulation—41.6 kB/sec, standard of the Ford Motor Company) has the following characteristics
   pin 2: Bus+
   pin 10: Bus−
   High voltage is +5 V
   Message length is restricted to 12 bytes, including CRC
   Employs a multi-master arbitration scheme called 'Carrier Sense Multiple Access with Non-Destructive Arbitration' (CSMA/NDA)
   SAE J1850 VPW (variable pulse width—10.4/41.6 kB/sec, standard of General Motors) has the following characteristics:
   pin 2: Bus+
   Bus idles low
   High voltage is +7 V
   Decision point is +3.5 V
   Message length is restricted to 12 bytes, including CRC
   Employs CSMA/NDA
   The ISO 9141-2 protocol has an asynchronous serial data rate of 10.4 kBaud and is primarily used in Chrysler, European, and Asian vehicles. It has the following characteristics:
   pin 7: K-line
   pin 15: L-line (optional)
   UART signaling (though not RS-232 voltage levels)
   K-line idles high
   High voltage is Vbatt
   Message length is restricted to 12 bytes, including CRC
   ISO 14230 KWP2000 (Keyword Protocol 2000) has the following characteristics:
   pin 7: K-line
   pin 15: L-line (optional)
   Physical layer identical to ISO 9141-2
   Data rate 1.2 to 10.4 kBaud
   Message may contain up to 255 bytes in the data field
   The ISO 15765 CAN (controller area network vehicle bus) (250 kBit/s or 500 kBit/s) protocol is a popular standard outside of the US automotive industry and is making significant gains into the OBD-II market share. As of 2008, all vehicles sold in the US are required to implement CAN, thus eliminating the ambiguity of the existing five signaling protocols.
   pin 6: CAN High
   pin 14: CAN Low Accordingly, because of the varying communication protocols, it is often necessary for a technician to purchase several different scan tools, each compatible with a particular OBD-II signal protocol. For example, a technician may need one scan tool for cars manufactured by the Ford Motor Company, and another scan tool for cars manufactured by General Motors. Thus, if a technician wishes to service a wide variety of vehicle makes and models, he often will have to make a substantial investment in scan tools. Moreover, because most scan tools are handheld devices that connect directly to a vehicle's DLC, the technician must carry out service directly next to, or inside of, the vehicle itself, which may be cumbersome or unsafe in a typical "garage" environment.

Moreover, there are typically two types of scan tools known in the art. A typical "aftermarket" scan tool has limited capability, only being capable of interfacing with certain modules and sub-systems, such as the engine control module and transmission control module, for purposes of maintaining proper fuel efficiency and emissions, Often, these aftermarket scan tools are limited to interfacing with those systems as dictated by SAE J2534. These aftermarket scan tools generally do not have the ability to read, analyze, manipulate, and reprogram the numerous other vehicle modules and sub-systems discussed below. A manufacturer-specific scan tool, on the other hand, is a scan tool designed to interface with all of the modules and sub-systems found within a vehicle and provides the ability to read, analyze, manipulate, program and reprogram such modules and sub-systems. Of course, the manufacturer-specific scan tools are much more expensive to own and maintain than the limited aftermarket scan tools. For one, the scan tool hardware itself is more expensive, but more importantly, the manufacturer-specific scan tools require daily, weekly, or monthly software updates in order to take advantage of the latest programming software. Accordingly, if a technician wishes to offer a full range of services for a particular vehicle manufacturer, he will have to purchase the expensive manufacturer-specific scan tool and a subscription so that he can obtain the latest software updates.

Various systems and methods for interfacing with a vehicle's OBD system are known in the art:

For example, U.S. Pat. No. 6,956,501 to Kitson describes an improved vehicle monitoring system for measuring the performance of the vehicle, including a wireless communication link for transmitting vehicle information to a terminal proximate to the vehicle, i.e. at a fuel station. The local terminal processes the information and communicates it to the operator of the vehicle through a display or other means. The system described in Kitson, however, is undesirable for at least two reasons. First, the system is only adapted for diagnostics and monitoring, i.e. "reading" data, and is not sufficient for vehicle programming, i.e. altering vehicle sub-systems. Second, Kitson only allows the transmission of vehicle data to a location proximate, i.e. next to, the vehicle. Kitson fails to provide for a system or method that enables a technician to program a vehicle's systems from a location substantially remote from the location of the vehicle.

U.S. Pat. No. 7,519,458 to Buckley describes a system, apparatus and method for obtaining and analyzing select vehicle data obtained from a vehicle. The system includes an interface communicatively coupled to the vehicle that obtains vehicle data associated with the operation of the vehicle. The system then communicates with a remote node via a network in order to obtain the necessary information to properly analyze the vehicle data. Once it has obtained the necessary information, the vehicle data is analyzed for diagnostic and monitoring purposes. Buckley, however, fails to provide for a system that is capable of carrying out bidirectional vehicle programming tasks from a remote location.

U.S. Patent Application Pub, No. 2005/0251304 to Cancellara, et. al. describes a system for performing both local and remote vehicle diagnostics, comprising a vehicle communications unit that acts as an intelligent interface to a vehicle to which it is connected and that is capable of performing autonomous vehicle diagnostics and communication functions. The system in Cancellara is designed only to provide for remote diagnostics, and does not describe a system and method for programming a vehicle. Moreover, Cancellara contemplates real-time diagnostics, i.e. "reading," of a vehicle in operation, and not programming or manipulation of vehicle sub-systems.

U.S. Pat. No. 7,532,962 to Lowrey et. al. describes a system for monitoring a vehicle's operational characteristics having a wireless appliance in contact with an in-vehicle computer having a data-collection component that supports communications software that collects diagnostic data from the computer, and a data-transmission component in communication with the data-collection component, configured to transmit an outgoing data packet comprising the diagnostic data over a network and receive over the same network an incoming data packet that modifies the communication software. Lowrey, like much of the prior art, provides for a system for carrying out diagnostics of a vehicle's operational characteristics, but does not provide a system or method for remote programming of a vehicle.

U.S. Patent Application Pub. No. 2009/0265055 to Gillies describes a hand-held interface device configured to wirelessly communicate with a wireless OBD device in a vehicle to be repaired. A network access point and other wireless devices may be used to access vehicle information, repair instruction, diagnostic information research information, remote expert guidance, remote databases and applications, and other repair and diagnosis information from the interface device. The system in Gillies essentially captures vehicle information, relays the information to a server, wherein the server provides assistance information to a technician based on the vehicle information. The system, however, is not capable of providing remote programming to the vehicle from the server.

U.S. Pat. No. 7,584,030 to Graham describes releasable connectors with a wireless connection between automotive test equipment and a vehicle's OBD computer wherein the data link cable is replaced, using two connectors which have been pre-programmed to communicate with each other. The device in Graham concerns local wireless communication between the vehicle's OBD and a scan tool through a wireless link established by the device. Graham does not contemplate remote transmission of programming data over a data network, nor does it contemplate remote programming of the vehicle over that network.

Accordingly, there is a need in the art for a system and method that allows a technician to service and program a vehicle, through its ODB interface, from a remote location. There is a further need in the art for a system and method for programming a vehicle that does not require a shop or garage to purchase numerous expensive scan tools for each specific vehicle make and/or model. There is a further need in the art for a system and method of programming a vehicle from a remote call center that has the capabilities to program a wide variety of vehicles implementing a wide variety of OBD communication protocols. There is a further need in the art for a system and method of programming a vehicle from a remote call center that has the capabilities of always having the most recent scan tool software for a wide variety of vehicle manufactures and model years. These and other objectives of the various embodiments of the present invention will become readily apparent in the following specification and appended claims.

SUMMARY OF THE INVENTION

Disclosed herein are various embodiments of a system and method for remotely programming a vehicle. In some embodiments, the system comprises a vehicle connector with a plurality of pins in communication with one or more vehicle sub-systems or modules, a vehicle communication device connected to the vehicle connector, a bi-directional communication link between the vehicle communication device and a remote communication device, and a computer system connected to the remote communication device. The vehicle communication device is configured to receive signals from the pins, convert the signals to a network compatible data packet which can then be transmitted to the remote communication device, which re-coverts the signals to the pin signals, which can be read by a computing system, such as a vehicle scan tool. Programming instructions can be sent from the scan tool to the vehicle, over the bi-directional communication link between the remote communication device and the vehicle communication device. In some embodiments, programming instructions are selected from the group of instructions consisting of reprogramming, program updating, calibration, linking, marriage, serial coding, security coding, and combinations thereof.

In some embodiments, the scan tool comprises a handheld computer scan tool known in the art. In other embodiments, the scan tool comprises a computer workstation executing scan tool emulation software.

In some embodiments, the bi-directional communication link is carried over an electronic communications network, such as the Internet, and allows web-based communication between the vehicle communication device and the remote communication device.

In some embodiments, the vehicle communication device and the remote communication device each have a socket, a communications processor; and a modem coupled to said communications processor. The socket of the vehicle communication device is adapted to engage a vehicle connector having a plurality of pins in communication with a one or more vehicle sub-systems, and the socket of said remote communication device adapted to engage a vehicle scan tool or like computer workstation. Again, the vehicle communication device and the remote communication device enabled to communicate over the bi-directional communication link, established between the modems of the respective devices. In some embodiments, the modems utilize a wired connection to the bi-directional communication link, such as Ethernet, universal serial bus, or the like. In other embodiments, the modems utilize a wireless connection to the bi-directional communication link, such as Wifi, Bluetooth, or a cellular data communications network.

In some embodiments, the present invention concerns a method of remotely programming one or more sub-systems of a vehicle, including the steps of: establishing a bi-directional communication link between a vehicle communication device and a remote communication device, where the vehicle communication device is in communication with one or more of the vehicle sub-systems and the remote communication device is in communication with a computer system or scan tool; requesting, from the vehicle communication device over the bi-directional communication link, one or more outgoing pin signals from one or more of the vehicle sub-systems; receiving, on the remote communication device over the bi-directional communication link, a network-compatible vehicle packet corresponding to the outgoing pin signals; converting, on the remote communication device, the vehicle packet to one or more of the outgoing pin signals; and transmitting the one or more outgoing pin signals to the computer system.

In some embodiments, the remote vehicle programming method also includes the steps of: generating programming instructions on the computer system; transmitting those programming instructions from the computer system to the remote communication device; converting, on the remote communication device, the programming instructions to a network-compatible programming packet; and transmitting the programming packet to the vehicle communication device over the bi-directional communication link.

DETAILED DESCRIPTION OF THE INVENTION

Figure 1:
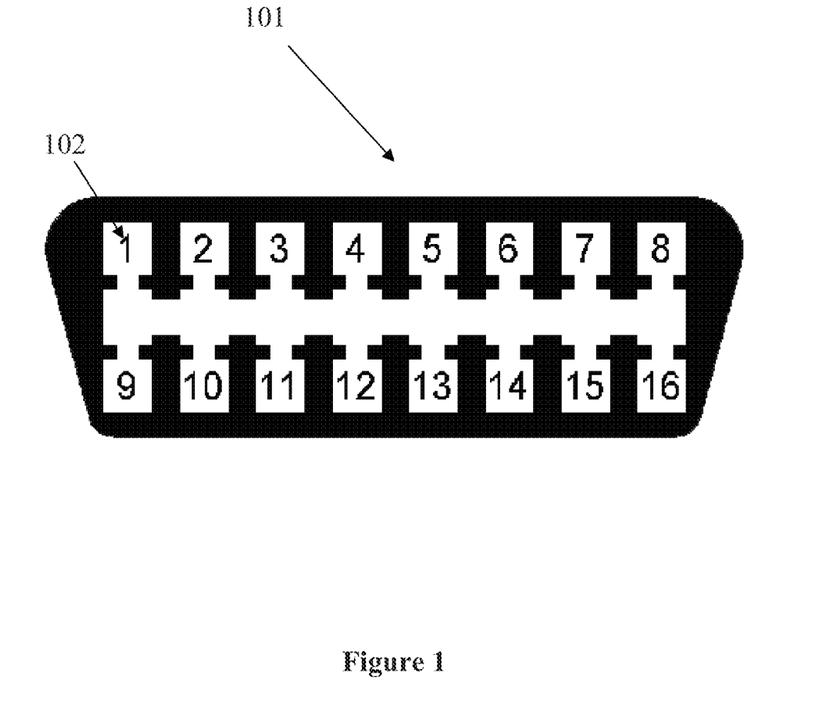
FIG. 1 is a diagram of one embodiment of a vehicle OBD connector.

The present invention concerns several non-limiting embodiments of a system and method for remotely programming a vehicle by way of the vehicle's OBD connector, A 16-pin OBD vehicle connector such as that shown in FIG. 1 is typically located under the dashboard in most modern vehicles, and accessible by a vehicle operator or technician, in some embodiments of the present invention, vehicle connector 1 is interfaced with the various electronic control units or "modules" located in the vehicle. Such units and modules may include, but are not limited to: Air bag control module; Alarm Control Module; Antenna Control Module; Automatic Control Module; Body Control Module; Cabin Heater Control Module; Central Control Module; Charging Control Module; Communication Control Module; Door Control Module; Electronic Brake Control Module; HVAC Control Module; Electronic Throttle Control Module; Engine Control Module; Headlamp Control Module; Instrument Control Module; Navigation Control Module; Park Assist Control Module; Power Mirror Control Module; Power seat control Module; Radiator Fan Control Module; Seat Heater Control Module; Steering Column Control Module; Steering Control Module; Steering Mounted Control Module; Sunroof Control Module; Transmission Control Module; Transfer Case Control Module; General Electronic Control Module; Moonroof Control Module; Suspension Control Module; Tire Pressure Control Module; Traction Control Module; Trailer Light Control Module. For purposes of this disclosure, these units and modules will be referred to collectively as vehicle "sub-systems."

In some embodiments, vehicle connector 101, as shown in FIG. 1, has two rows each of eight pins 102. Pins 102 are in communication with the various vehicle sub-systems such as those listed above. Accordingly, in any given vehicle, each of the sixteen pins 102 are enabled to output a vehicle signal corresponding to a particular sub-system or other function. It is understood that it is not necessary that a signal is present on all sixteen pins 102 simultaneously; rather, the signal configuration of pins 102 can vary on a pin-by-pin basis according to a desired communication protocol, i.e. signal format. For exemplary purposes only, such communication protocols may include the above described SAE J1850 PWM, SAE VPM, ISO 9141-2, ISO 14230, and ISO 15765 protocols.

It is understood that the vehicle signals present on each of the pins 102 may be analog or digital, and such format need not be the same across all pins 102, it is further understood that in some embodiments, vehicle connector 101 may be configured as a "female" connector and in others it may be configured as a "male" connector.

As noted above, it is usual for a scan tool or other computing device to be connected to vehicle connector 101 by a data cable, for the scan tool to receive vehicle data corresponding to the various vehicle sub-systems. To that end, the scan tool or computing device usually must be located proximate to the vehicle for data analysis and programming to be carried out. However, the present invention contemplates a bi-directional communication system that is adapted to transmit the vehicle signals present on pins 102 across a computer network for remote data analysis and manipulation and to permit remote programming of the subject vehicle's sub-systems. The bi-directional communication link between the vehicle and the remote location allows a technician at the remote location to program a vehicle via a scan tool or computing system, as if he were standing proximate to the vehicle.

Figure 2:
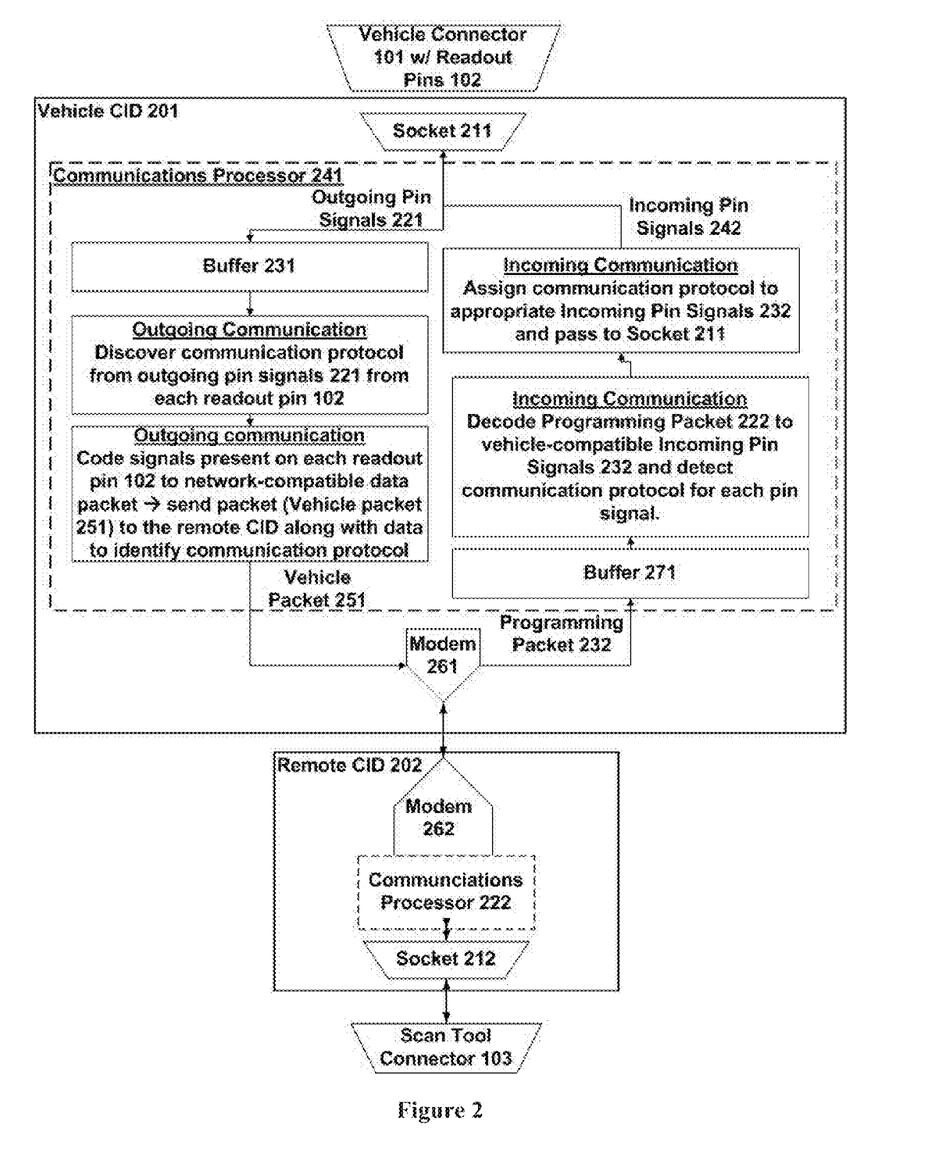
FIG. 2 is a schematic of one embodiment of the communication interface devices of the present invention.

As shown in FIG. 2, one aspect of the present invention contemplates a communication system and associated methods comprising two communications devices, hereafter referred to as "CIDs." As noted above, the purpose of the CIDs is to create a bi-directional communication link between a subject vehicle's vehicle connector 101 at one location and a scan tool or computer at a second, remote location such that a technician can remotely program the subject vehicle. Accordingly, shown schematically are embodiments of vehicle CID 201 and remote CID 202. In some embodiments, Vehicle CID 201 has a socket 211, communications processor 241, and modem 261. Similarly, remote CID 202 has a socket 212, communications processor 222, and modem 262.

Vehicle CID 201 is engaged with vehicle connector 101 via socket 211. In some embodiments, socket 211 is configured to engage pins 102 of vehicle connector 101, such that the vehicle signals present on pins 102 can be received by CID 201 and processed by communications processor 241. To that end, communications processor 241 contains operational logic that enables outgoing pin signals 221 to be converted to a network-compatible packet, vehicle packet 251, which can be transmitted over a computer network to remote CID 202, by modem 261.

Remote CID 202 is in communication with a scan tool or computing system whereby socket 212 is engaged with scan tool connector 103, which has the same pin configuration as the vehicle connector 101 described above. Accordingly, remote CID 202 is enabled to request and receive vehicle packet 251 (from modem 261 of vehicle CID 201) via modem 262, to which communications processor 222 processes the packet, re-converts it to pin signals, which can then be communicated to a scan tool or computer system (over scan tool connector 103) for analysis and programming. In that sense, the vehicle packet 251 provides "read" data for remote CID 202, which can be used to determine the present state of a given vehicle sub-system, as well as determine whether there are errors, anomalies, or other problems with that sub-system.

Accordingly, a technician can utilize the scan tool or computer system to send programming instructions to the vehicle over the bi-directional communications link. For example, programming instructions are sent from the scan tool or computer system over scan tool connector 103 to remote CID 202 via socket 212. As the programming instructions are initially signals that are pin-compatible, the communications processor 222 of remote CID 202 converts the signals much in the same manner as described above with respect to vehicle CID 201, and then relays a network-compatible programming packet 232 over the bi-directional communications link (i.e. modem 262 to modem 261) to vehicle CID 201. Vehicle CU) 201 receives the programming packet 232 and re-converts it to vehicle-compatible incoming pin signals 232 which are passed to the vehicle through the socket 211-vehicle connector 101 engagement.

As shown and described in FIG. 2, communication processors 241 and 222 contain software logic to request and read vehicle-compatible pin signals, determine the communication protocol, i.e. signal format, of those pin signals and convert the pin signals to a network-compatible data packet. Accordingly, in some embodiments, the vehicle packet 251 and programming packet 232 may contain data to identify the communication protocol of the incoming and outgoing data. In some embodiments, this identifying information is necessary in order for the scan tool or computing system to determine the proper programming software, dependent on, for example, vehicle make and model. In other words, to the extent that each vehicle manufacturer has a unique communication protocol, i.e. signal format, the scan tool or computing system is capable of recognizing that protocol in order to properly program the vehicle. The various communications protocols may include, but are not limited to, those discussed in the Background section of this disclosure above.

Based on the foregoing, it is understood that vehicle CID 201 and remote CID 202 enable a bi-directional exchange of information. Vehicle data, i.e. vehicle packet 251, is sent to the remote location which can then be read, analyzed, and processed by a technician who can send new vehicle data, i.e. programming packet 232, back to the subject vehicle. It is understood that, once the bi-directional communication link is established, data transfer can be initiated from either the vehicle, or the remote location, depending on the situation and desired programming tasks. In some embodiments, the remote CID 202 requests output pin signal information from vehicle CID 201, which is then transmitted to remote CID 202 as vehicle packet 251.

In some embodiments, modems 261 and 262 communicate with a computer network over a wired connection such as a standard telephone connection (RJ-11), category-5 Ethernet connection (RJ-45), universal serial bus (USB) connection, firewire (IEEE1394), or other serial or parallel data transmission connections known in the art. In some embodiments modems 261 and 262 communicate with an electronic communications network over a wireless connection such as WiFi, Bluetooth, Near-Field Communication (NFC), or a cellular data communications network protocol such as GSM, UMTS, or CDMA, EDGE, 3G, 4G, LTE, HSDPA, EV-DO, or the like. The modems do not have to be utilizing the same connection standard, as long as each can access the electronic communications network (for example, the Internet) to establish the bi-directional communication link.

It is understood that each particular vehicle CID 201 and remote CID 202 may optionally have a unique identifier, such as a unique static interne protocol ("IP") address or other identification code, embedded within its logic. The unique identifier can be included in, or in addition to, the vehicle packet sent from vehicle CID 201 to remote CID 202. In some embodiments, the unique identifier assists the remote location in identifying the source and ownership information for a given vehicle CID and can also be used to verify that the vehicle CID is being operated by the correct entity, i.e. the individual technician or shop that the vehicle CID has been assigned to.

In some embodiments, the vehicle CID 201 is enabled such that its internal software and logic can be configured before use to initiate and maintain a proper bi-direction communication link with the remote CID 202. For example, upon receiving a vehicle CID 201, the technician or shop may temporary connect it to a local computer or workstation (by USB, Bluetooth, or other wired or wireless connection protocols discussed herein) and execute appropriate software to configure the vehicle CID 201 to connect to the shop's Internet connection and to communicate with the remote CID 202 at the remote location. Accordingly, the vehicle CID 201 (as well as the remote CID 202) may have internal memory that is capable of storing configuration data such that it is capable of re-connected to the Internet during subsequent use, without the need for further configuration. It is understood, however, that configuring the vehicle CID 201 does not have to be carried out by a local computer or workstation, rather configuration can be done through an interface on the device itself or it may be pre-configured when the shop obtains it.

Figure 3:
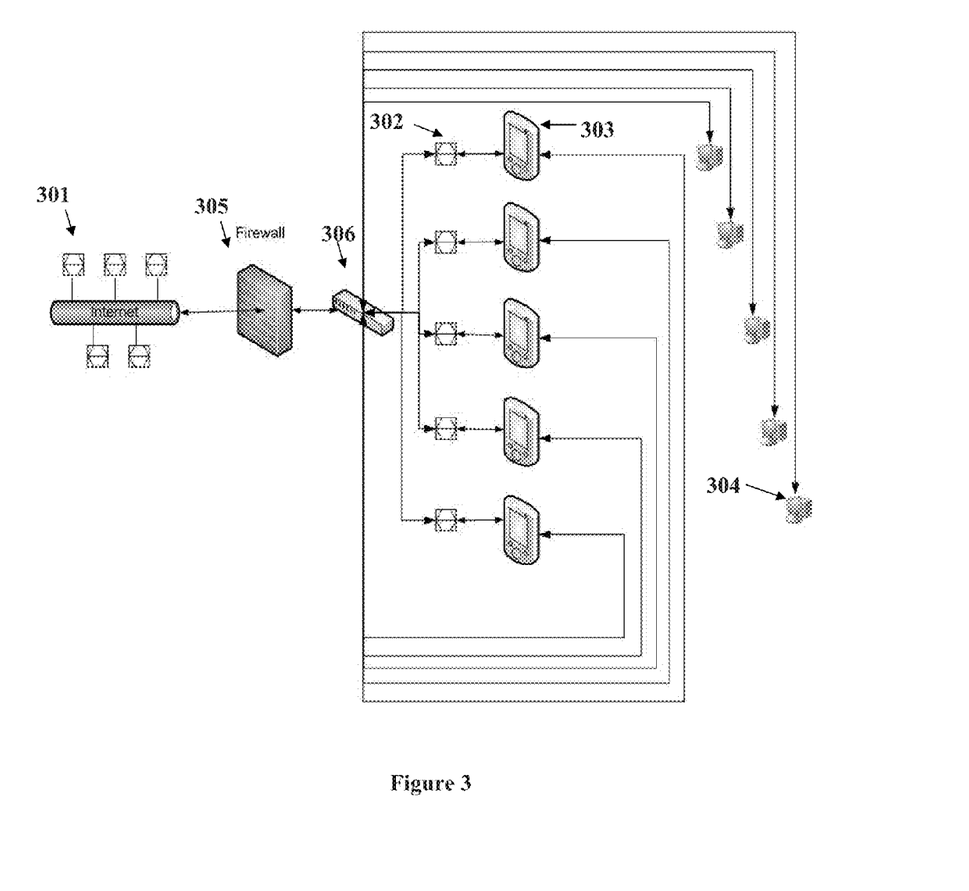
FIGS. 3-8 are several embodiments of the system of the present invention, depicting the various component parts thereof.

FIGS. 3-8 depict various embodiments of the remote vehicle programming system and method of the present invention. Beginning with FIG. 3, shown is vehicle CID 301, remote CID 302, scan tool 303, and workstation 304, it being understood that vehicle CID 301 is proximal to the subject vehicle and the remaining components, namely remote CID 302, scan tool 303, and workstation 304, are at a location remote from the location of the vehicle.

In accordance with the above, vehicle CID 301 is engaged with the pins 102 of the vehicle connector 101 (not shown) of a subject vehicle (not shown). A bi-directional communication link is established between vehicle CID 301 and remote CID 302 over an electronic communications network, such as the Internet. It is understood that the communication between the two CIDs 301 and 302 occurs via the modems (not shown) of each; and in this case, over a wired connection.

Vehicle CID 301 is enabled to receive the vehicle signals present on pins 102, convert the vehicle signals to a network-compatible data packet and relay the data packet, i.e. the vehicle packet, to remote CID 302 over the bi-directional communication link. Remote CID 302 is configured to request and receive the vehicle packet and convert it back to vehicle-compatible signals. The vehicle signals can then be processed and analyzed by scan tool 303, which is in communication with remote CID 302 through an OBD connection (like, for example, scan tool connection 103 described above), as if the scan tool 303 were directly connected to vehicle CID 301.

Accordingly, scan tool 303 is a computing system including specialized software that is adapted to process the particular communication protocols of the vehicle signals outputted from a given vehicle. The scan tool can also generate new programming information, independent or dependent of the vehicle signals, and output the information back to the CID system as vehicle-compatible programming signals.

Because the communication link is bi-directional, vehicle-compatible programming signals can be sent from scan tool 303 and/or workstation 304 to remote CID 302. Remote CID 302 then converts the programming signals to a network-compatible data packet, i.e. programming packet, which can be relayed back to vehicle CID 301. Vehicle CID 301 then re-converts the programming packet to vehicle compatible programming signals (pin compatible) which are then transmitted to the particular vehicle sub-systems over pins 102 of vehicle connector 101. Accordingly, vehicle packets and programming packets can be exchanged between the vehicle and the remote location, in either direction, to enable remote analysis and programming of the vehicle.

It is understood that because each vehicle make and model may have different ODB communication protocols, i.e. signal formats, it may be desirable to have available a number of different scan tools 303 to assure compatibility. Accordingly, as discussed above, the CIDs 301 and 302 may be configured to include communication protocol, i.e. signal format, data across the bi-direction communications link in order for the scan tool 303 to properly identify, read, analyze, and manipulate vehicle packets. Optionally, scan tool 303 can be in communication with workstation 304 (via network switch 306) allowing remote manipulation of scan tool 303. In this arrangement, a plurality of scan tools 303 and their corresponding remote CIDs 302 can be located in a discrete area of the remote location wherein the workstations 304 are elsewhere at the remote location, such as a call-center or cluster of desks or cubicles.

FIG. 3 depicts a plurality of vehicle CIDs 301, remote CIDs 302, scan tools 303, and workstations 304. Accordingly, the present invention contemplates that more than one vehicle may be serviced and programmed at a given time, and thus it is desirable to have multiple systems operating simultaneously. Accordingly, network switch 306 may be introduced at the remote location to permit a plurality of remote CIDs 302 to receive data over a single network connection (i.e. Internet connection). In some embodiments, each CID is configured to identify and transmit information concerning the communication protocol, i.e. signal format, in order for the scan tool to properly identify the vehicle data. Further, the plurality of workstations 304 are connected to the system and placed in communication with scan tools 303 via network switch 306. Optionally shown is firewall 305 which may be placed before network switch 306 to secure the system in accordance with known network security and encryption protocols.

Figure 4:
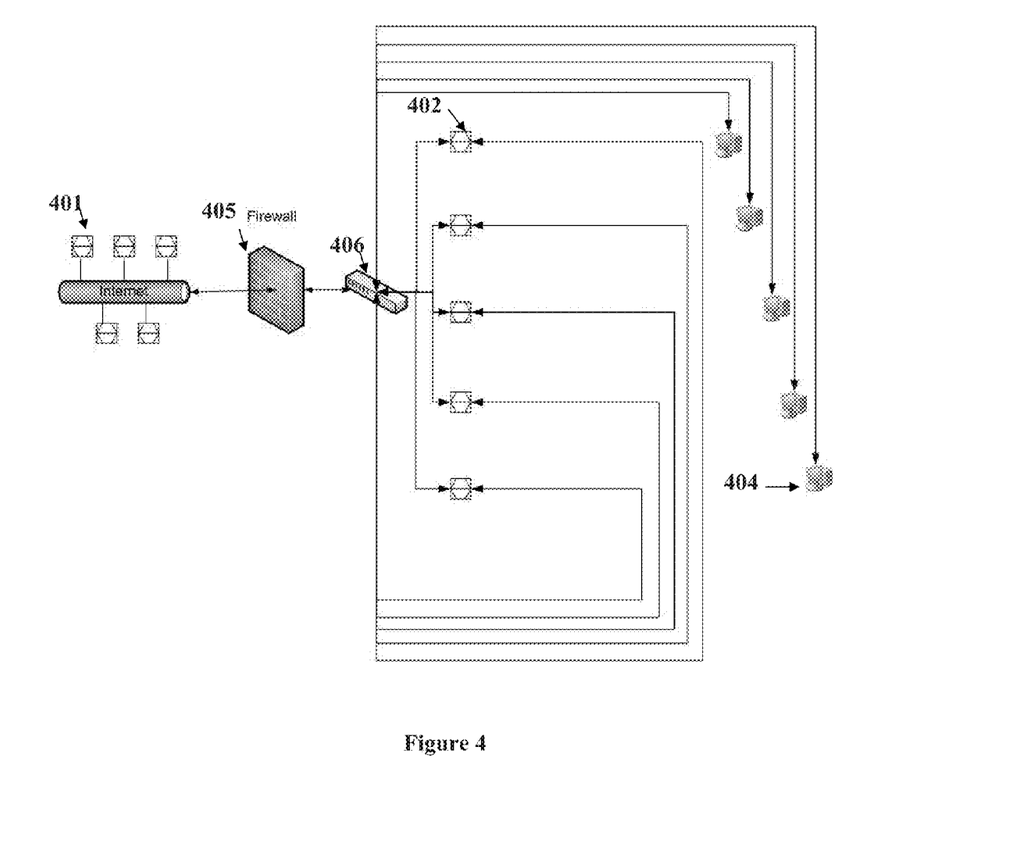

Turning to FIG. 4, shown is vehicle CID 401, remote CID 402, workstation 404, firewall 405, and network switch 406. In this embodiment, the scan tool is omitted in favor of emulation software running on workstation 404, which is interfaced to the system via network switch 406. The emulation software is designed to read and process vehicle signals received from remote CID 402, and, based on the communication protocol, call up the appropriate make and model scan tool software to permit data analysis and vehicle programming. In accordance with this embodiment, workstation 404 may have an appropriate OBD connector in order to interface with remote CID 402.

Figure 5:
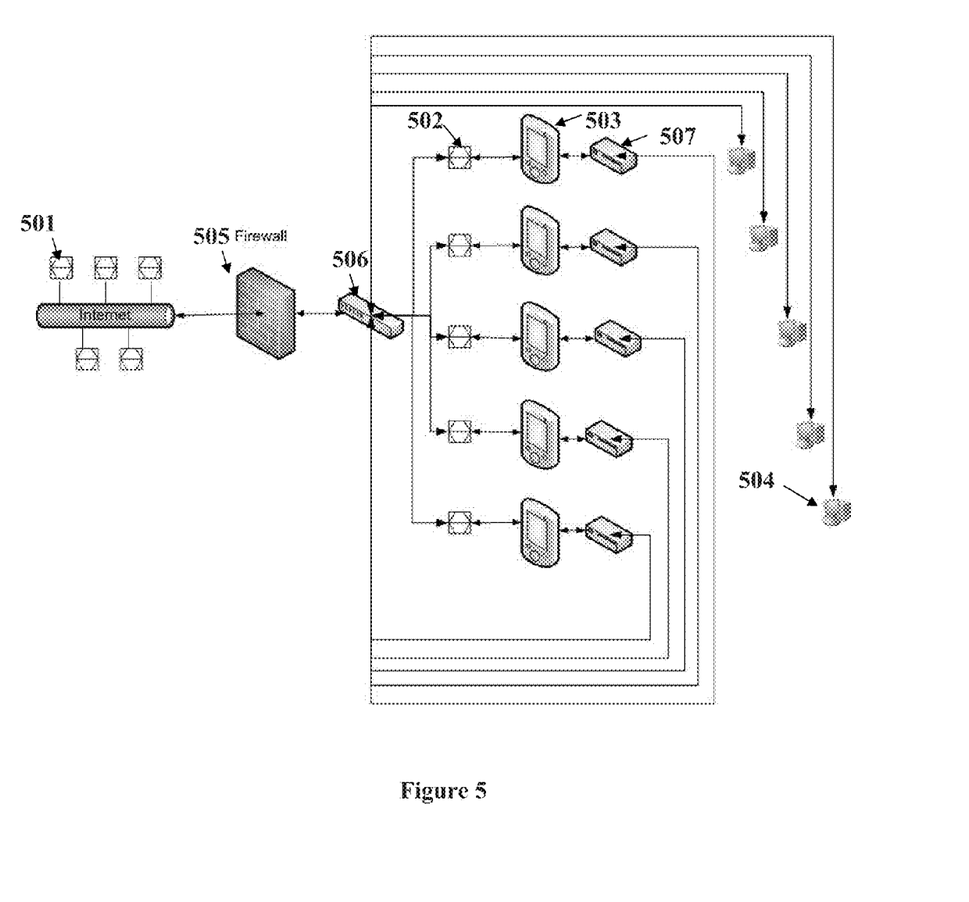
Figure 6:
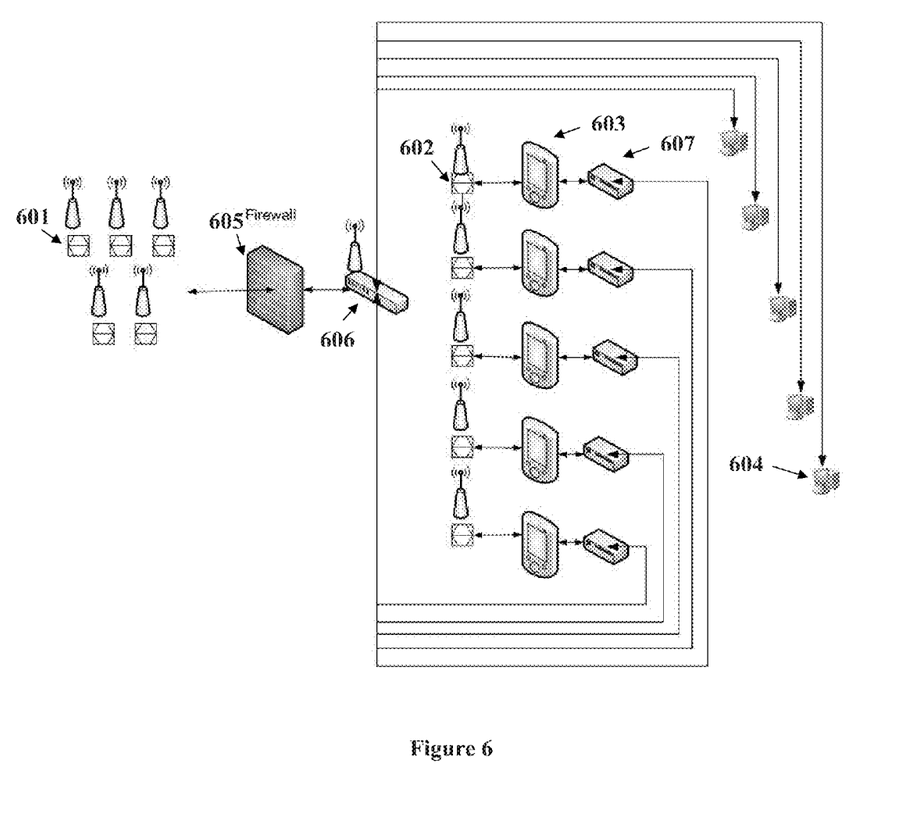

FIG. 5 depicts vehicle CID 501, remote CID 502, scan tool 503, workstation 504, firewall 505, network switch 506, and thin client 507. In this embodiment, scan tool 503 is coupled to thin client 507 which is in turn coupled to workstation 504, all via network switch 506. Accordingly, data analysis and programming can be conducted from workstation 504, with instructions relayed to thin client 507 and then to scan tool 503. In this configuration, thin client 507 has the effect of reducing computing resource requirements on workstation 504, as well as provides an additional means of data security and encryption. FIG. 6 depicts a similar system configuration as that shown in FIG. 5, however utilizing wireless communication for vehicle CID 601, remote CID 602, and network switch 606.

Figure 7:
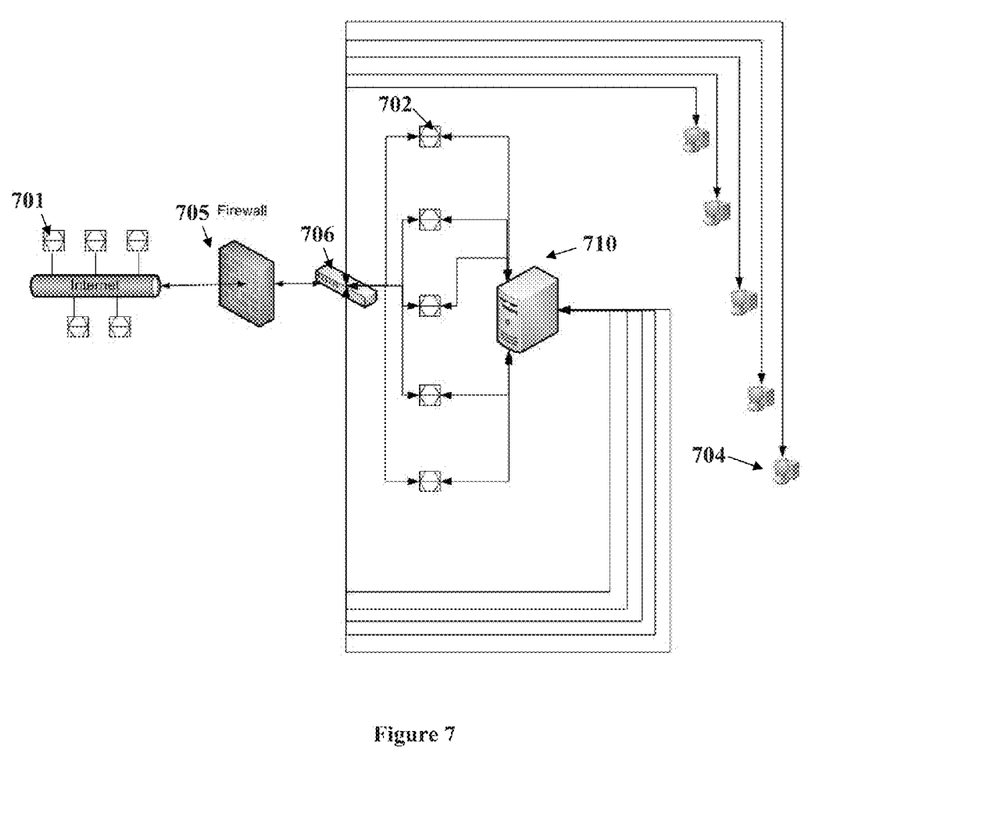
Figure 8:
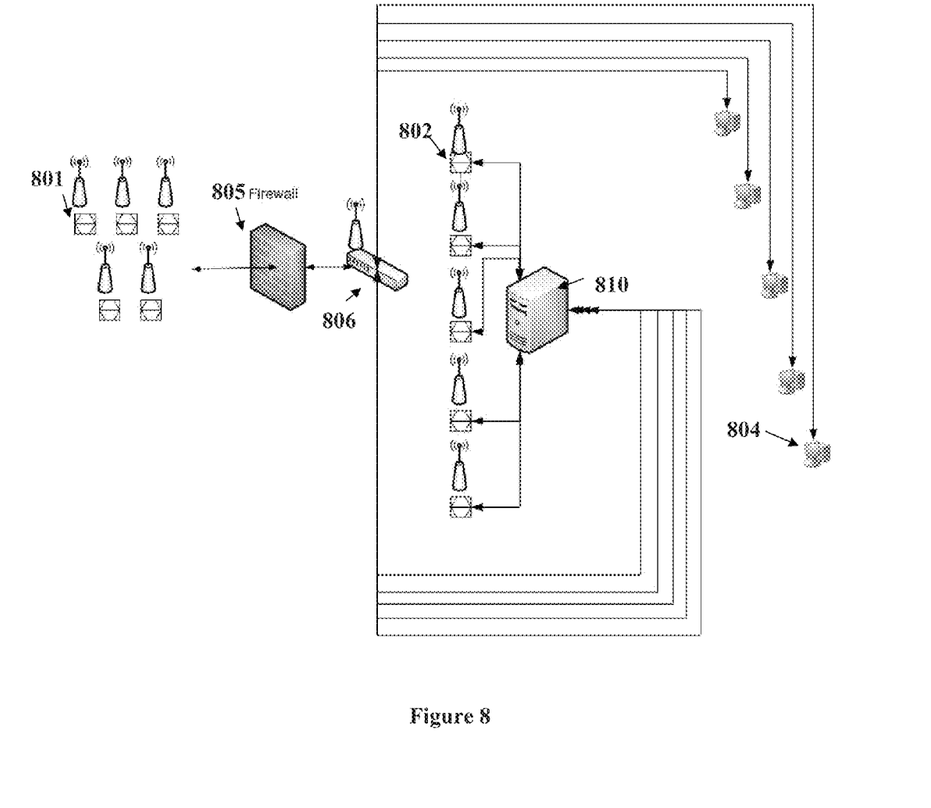

Turning to FIG. 7, shown is vehicle CID 701, remote CID 702, workstation 704, firewall 705, network switch 706, and server 710. In this embodiment, the scan tool is omitted in favor of emulation software running on server 710, with server 710 configured as a "cloud" for workstations 704, which components are interconnected via network switch 706. The emulation software is designed to read and process vehicle signals received from remote CID 702, and, based on the communication protocol, call up the appropriate make and model scan tool software to permit data analysis and vehicle programming. In accordance with this embodiment, server 710 may have an appropriate OBD connector in order to interface with remote CID 702. Workstation 704 interfaces with server 710 to retrieve vehicle packets, conduct programming and analysis, and relay programming packets to vehicle CID 701. FIG. 8 depicts a similar configuration, utilizing wireless communication.

As noted throughout this disclosure, the system and method of the present invention allows for remote programming a plurality of vehicle subs-systems from a remote location. The term "programming" therefore contemplates a variety of actions that can be carried out on the vehicle sub-systems, by way of specifically designed programming packets relayed from the scan tool or computing system to the vehicle over the vehicle CID-remote CID bi-directional communication link. Such actions may include, but are not limited to, reading, reprogramming, program updating, calibration, linking, marriage, serial coding, and security coding.

"Reprogramming" may comprise relaying programming packets enabled to replace, alter, reset, or otherwise change defective or absent programming in a vehicle sub-system with complete and up to date programming information.

"Program update" may comprise relaying programming packets enabled to replace existing, but out-dated programming in a sub-system with the latest original equipment manufacturers' (OEM) programming and configuration. Alternatively, these packets may include custom programming updates. Such programming updates may contemplate, for example, performance upgrades to the engine control module, transmission control module, and related modules in order to increase engine horsepower output or shifting intervals. These program updates are particularly useful for "tuning" high performance vehicles such as racing cars and "hot rods."

"Calibration" may comprise relaying programming packets enabled to tune the output signals from various sensors with the vehicle sub-systems to correctly read input signals coming from other vehicle sub-system. Additionally, "calibration" contemplates the resetting of "set-points" or parameters within the vehicle sub-systems.

"Linking" or "pairing" may comprise relaying programming packets enabled to establish bi-directional communication between two or more vehicle sub-systems. This is a required step when replacing a module or sub-system in a vehicle, so that the other modules or sub-systems will accept and communicate with it.

"Marriage" is similar to linking except that it involves integration at the vehicle level and not just sub-system to sub-system communication. For example, the programming packet may instruct a sub-system to communicate with the vehicle to identify its vehicle identification number YIN to verify that the sub-system belongs in that vehicle. "Serial coding" is another term for linking or marriage.

Finally, "security coding" may comprise relaying programming packets enabled to link or marry a particular security-related sub-system with the vehicle, for example the door control module, or security module.

It is understood that, for purposes of carrying out these programming activities or actions, it will often be desired for the remote CID to conduct a "read" of the vehicle to determine the present state of the various vehicle sub-systems, by way of the vehicle CID. Accordingly, in some embodiments, vehicle CID sends vehicle packets to remote CID which are read and analyzed by the scan tool, workstation or other computing system in order to determine if there are errors or missing elements within the particular sub-system. At that point, a technician can generate, on the scan tool or computing system, specifically designed programming packets designed to carry out the various actions disclosed herein, in order to correct, replace, reset or manipulate the state of the sub-system(s), depending on a desired result.

Moreover, the programming actions disclosed herein are adapted to be performed in either "key-on" or "key-off" operating mode. In a "key-on" mode, the system and method herein can be utilized to read, analyze, manipulate, and program certain sub-systems that are active when the vehicle's engine is operating. It may be desirable to carry out data analysis and programming when the engine is operating because certain of the sub-systems output different data as compared to a "key-off" operating mode. On the other hand, "key-on" operating made may cause certain sub-systems to "lock out" and prevent data analysis, and programming, for safety purposes; therefore, "key-off" operating mode may be necessary to program certain of those sub-systems.

As noted throughout this disclosure, the present invention contemplates a variety of useful methods incorporating the various components of the remote vehicle programming system disclosed herein. In a practical setting, remote vehicle programming in accordance with the present invention may occur in several ways. One example concerns an "appointment" model. In this example, the shop or garage at one location schedules an appointment for vehicle programming with a "call center" at the remote location. At the appropriate time, the shop connects its vehicle CID to the subject vehicle's OBD connector and then initiates a connection between the vehicle CID and the Internet, et. At substantially the same time, the call center initiates a connection between its remote CID and the Internet. The call center then places a telephone call or initiates some other form of direct communication with a technician or other individual at the shop in order to confirm that the vehicle CID has a proper connection to the Internet. Once the connection has been confirmed, the call center establishes the bi-directional communication link between the remote CID and the vehicle CID, identifying the vehicle CID using the previously mentioned unique identifier information.

At that point, data can be exchanged between the vehicle CID and remote CID. In some embodiments, once the bi-directional communication link has been established, the call center, using a workstation, scan device, server, or combinations thereof, begins relaying programming packets from the remote location to the vehicle. In other embodiments, the call center begins first by receiving vehicle data from the vehicle, and then analyzes the data to carrying out appropriate programming. However, these examples are to be construed as non-limiting as the bi-directional communication link is dynamic and, therefore, any desired sequence of data communication and programming is possible.

In other embodiments, programming may be accomplished on an "on-demand" basis rather than "appointment" basis. Accordingly, the shop at one location connects its vehicle CID to a subject vehicle's OBD connector and then initiates a connection between the vehicle CID and the Internet. Then, the shop sends a "job request" to the call center at the remote location by telephone, by computer, or even by the vehicle CID itself. The call center receives the job request after which it initiates the bi-directional communication link between the appropriate remote CID and the vehicle CID. At that point, data analysis, manipulation, and sub-system programming can begin.

As mentioned previously, in some embodiments, the call center may employ numerous remote CID-scan tool/workstation combinations in order to provide programming capabilities for a wide variety of OBD communication protocols, i.e. signal formats. Accordingly, the call center may have an array of remote CIDs and scan tools in place, to provide optimal compatibility and flexibility. When the bi-directional communication link is first established, the remote CID will request and receive communication protocol information from the vehicle packet sent from the vehicle CID. The call center, therefore, is configured to read the communication protocol information in order to configure the appropriate scan tool/workstation/emulation sever to begin programming.

While many of the embodiments of the present invention disclosed herein concern passenger automobiles, the ter "vehicle" should not be construed as limiting. Accordingly, the system and method herein has many applications, including but not limited to, marine, aircraft, heavy equipment, commercial vehicles, stationary equipment, and industrial equipment, provided such machines are controlled by various electronic control modules and subsystems and are adapted to be programmed by a scan tool or computing system.

It is further understood that the scan tools, servers, and workstations implemented in the present invention as discussed above may comprise a variety of computing systems including, but not limited to, a computer server, a personal computer, a laptop computer, a netbook computer, a tablet computer, a mobile telephone such as a smartphone, and the like. The following description of the typical computing system is included only for illustrative purposes and should not be considered a limitation of the invention. Although this description may refer to terms commonly used in describing particular types computing system, the described concepts apply equally to other computing system, including systems having architectures that are dissimilar to that described.

The computing systems such as scan tools (being a "handheld" computing system), servers, and workstations described above may include a central processing unit (CPU) having a conventional microprocessor, random access memory (RAM) for temporary storage of information, and read only memory (ROM) for permanent storage of "read only" information. A memory controller is provided for controlling system RAM. A bus controller is provided for controlling a data bus, and an interrupt controller is provided for receiving and processing various interrupt signals from the other system components. Data storage may be provided by known non-volatile, removable media storage drives, such as a diskette drives, DVD drives, CD-ROM drives, ZIP® drives, flash drives, magneto-optical ("MO") drives, and the like, or by non-removable storage systems like hard drives. Data and software may be exchanged with the computing systems via removable media, such as floppy diskettes, CD-ROMs, DVDs, ZIP® disks, MO disks, flash drives and the like. The removable media is insertable into a compatible removable media storage drive, which, in turn, utilizes a controller to interface with the data bus. The non-removable storage system is part of a fixed disk drive, which utilizes a hard drive controller to interface with the data bus. User input to the computer may be provided by a number of devices. Examples include a keypad, a keyboard, a mouse, and a trackball, which may be connected to the data bus by an input controller. A direct memory access (DMA) controller is provided for performing direct memory access to system RAM. A visual display may be generated by the graphics subsystem of the computing system that controls the display device attached to the computing system. The display device can be a conventional cathode ray tube ("CRT"), liquid crystal display ("LCD"), light-emitting diode ("LED"), or plasma monitor having individually addressable picture elements ("pixels".) The pixels are arranged in a two-dimensional X-Y grid and are selectively illuminated, as directed by the graphics subsystem, for assembling an image, or a series of images (or frames) to create moving pictures.

A network interface adapter also may be included that enables the various computing systems to connect to the described network via a network bus. The network, which may be a local area network (LAN), a wide area network (WAN), an electronics communication network, i.e. the Internet, or the like, may utilize general purpose communication protocols that interconnect a plurality of network devices. The computing system is controlled and coordinated by operating system ("OS") software, such as, for exemplary purposes only, Windows®, Mac OSX, Apple iOS, Linux, Unix, Android OS, PalmOS, Windows Mobile OS, and the like. Among other functions, the OS controls allocation of system resources and performs tasks such as process scheduling, memory management, networking, and I/O services.

In the foregoing description, the present invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense. Accordingly, it is not intended that the invention be limited except as may be necessary in view of the appended claims.

We claim:

1. A system for remotely programming one or more sub-systems of a vehicle, comprising:
    a vehicle connector having a plurality of pins, said pins in communication with a said one or more sub-systems;
    a vehicle communication device connected to said vehicle connector;
    a bi-directional communication link between said vehicle communication device and a remote communication device;
    a computer system connected to said remote communication device;
    wherein said vehicle communication device is configured to:
        receive one or more outgoing pin signals present on said pins, said pin signals containing data corresponding to one or more said sub-systems;
        convert said one or more outgoing pin signals to a network-compatible vehicle packet;
        transmit said vehicle packet to said remote communication device over said bi-directional communication link;
    wherein said remote communication device is configured to:
        re-convert said vehicle packet to said one or more outgoing pin signals; and
        transmit said one or more outgoing pin signals to said computer system; and
    wherein said computer system and said vehicle connector are engaged in continuous bi-directional communication using a standard OBD communications protocol; and
    wherein said computer system is enabled by said continuous bi-directional communication using a standard OBD communications protocol to actively and continuously communicate with, scan and program said sub-systems as if it were located proximate to said vehicle.

2. The system of claim 1:
wherein one or more programming instructions are sent from said computer system to said remote communication device;
wherein said remote communication device is configured to:
convert said programming instructions to a network-compatible programming packet;
transmit said programming packet to said vehicle communication device over said bi-directional communication link;
wherein said vehicle communication device is configured to:
convert said programming packet to one or more incoming pin signals;
transmit said one or more incoming pin signals to said one or more sub-systems of said vehicle over said pins and
wherein said standard ORD communications protocol is selected from the group comprised of SAE J2284, SAE J1850 PWM, SAE VPM ISO 9141, ISO 14230, and ISO 15765.

3. The system of claim 2 wherein said one or more sub-systems are selected from the group consisting of: Air bag control module, Alarm Control Module, Antenna Control Module, Automatic Control Module, Body Control Module, Cabin Heater Control Module, Central Control Module, Charging Control Module, Communication Control Module, Door Control Module, Electronic Brake Control Module, HVAC Control Module, Electronic Throttle Control Module, Engine Control Module, Headlamp Control Module, Instrument Control Module, Navigation Control Module, Park Assist Control Module, Power Mirror Control Module, Power seat control Module, Radiator Fan Control Module, Seat Heater Control Module, Steering Column Control Module, Steering Control Module, Steering Mounted Control Module, Sunroof Control Module, Transfer Case Control Module, General Electronic Control Module, Moonroof Control Module, Suspension Control Module, Tire Pressure Control Module, Traction Control Module, Trailer Light Control Module, and combinations thereof.

4. The system of claim 3, wherein said programming instructions are selected from the group of instructions consisting of reprogramming, program updating, calibration, linking, marriage, serial coding, security coding, and combinations thereof.

5. The system of claim 1, wherein said computer system is a vehicle scan tool.

6. The system of claim 1, wherein said bi-directional communication link is carried over the Internet.

7. The system of claim 6, wherein said vehicle communication device or said remote communication device connects to said bi-directional communication link through a wired connection selected from the group consisting of a telephone connection, Ethernet connection, universal serial bus connection, firewire connection, and combinations thereof.

8. The system of claim 6, wherein said vehicle communication device or said remote communication device connects to said bi-directional communication link through a wireless connection selected from the group consisting of WiFi, Bluetooth, a cellular data communications network, and combinations thereof.

9. A method of remotely programming one or more sub-systems of a vehicle, comprising:
connecting a vehicle communication device and a remote communication device; said vehicle communication device in communication with said one or more sub-systems and said remote communication device in communication with a computer system;
establishing continuous bi-directional communication using a standard OBD communications protocol between said vehicle communications device and said computer system
said computer system requesting, from said vehicle communication device over said continuous bi-directional communication link, a network-compatible vehicle packet corresponding to one or more outgoing pin signals from said one or more vehicle sub-systems;
receiving, on said remote communication device over said continuous bi-directional communication link, said network-compatible vehicle packet;
converting, on said remote communication device, said vehicle packet to said one or more outgoing pin signals; and
transmitting said one or more outgoing pin signals to said computer system;
wherein said computer system is enabled by said continuous bi-directional communication using a standard OBD communications protocol to actively and continuously communicate with, scan and program said sub-systems as if it were located proximate to said vehicle.

10. The method of claim 9, further comprising the steps of:
generating programming instructions on said computer system;
transmitting said programming instructions from said computer system to said remote communication device;
converting, on said remote communication device, said programming instructions to a network-compatible programming packet; and
transmitting said programming packet to said vehicle communication device over said bi-directional communication link.

11. The method of claim 10, wherein said one or more sub-systems are selected from the group consisting of Air bag control module, Alarm Control Module, Antenna Control Module, Automatic Control Module, Body Control Module, Cabin Heater Control Module, Central Control Module, Charging Control Module, Communication Control Module, Door Control Module, Electronic Brake Control Module, HVAC Control Module, Electronic Throttle Control Module, Engine Control Module, Headlamp Control Module, Instrument Control Module, Navigation Control Module, Park Assist Control Module, Power Mirror Control Module, Power seat control Module, Radiator Fan Control Module, Seat Heater Control Module, Steering Column Control Module, Steering Control Module, Steering Mounted Control Module, Sunroof Control Module, Transfer Case Control Module, General Electronic Control Module, Moonroof Control Module, Suspension Control Module, Tire Pressure Control Module, Traction Control Module, Trailer Light Control Module, and combinations thereof.

12. The method of claim 11, wherein said programming instructions are selected from the group of instructions consisting of reprogramming, program updating, calibration, linking, marriage, serial coding, security coding, and combinations thereof.

13. The method of claim 9, wherein said computer system is a vehicle scan tool.

14. The method of claim 9, wherein said bi-directional communication link comprises the Internet.

15. The method of claim 9, wherein said vehicle communication device or said remote communication device connects to said bi-directional communication link through a wired connection selected from the group consisting of a telephone connection, Ethernet connection, universal serial bus connection, firewire connection, and combinations thereof.

16. The method of claim 9, wherein said vehicle communication device or said remote communication device connects to said bi-directional communication link through a wireless connection selected from the group consisting of WiFi, Bluetooth, a cellular data communications network, and combinations thereof.

17. The method of claim 9 wherein said standard OBD communications protocol is selected from the group comprised of SAE J2284, SAE J1850 PWM, SAE VPM, ISO 9141, ISO 14230, and ISO 15765.

* * * * *